United States Patent
Van Lier (10) Patent No.: US 12,007,991 B2
(45) Date of Patent: Jun. 11, 2024

(54) AUTOMATION DEVICE AND METHOD FOR OPTIMIZED ACCESS TO A VARIABLE

(71) Applicant: WAGO VERWALTUNGSGESELLSCHAFT MBH, Minden (DE)

(72) Inventor: Stefan Van Lier, Minden (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 0 days.

(21) Appl. No.: 16/253,848

(22) Filed: Jan. 22, 2019

(65) Prior Publication Data

US 2019/0228013 A1 Jul. 25, 2019

(30) Foreign Application Priority Data

Jan. 19, 2018 (DE) ...................... 10 2018 101 203.9

(51) Int. Cl.
*G06F 16/2453* (2019.01)
*G06F 9/46* (2006.01)
(Continued)

(52) U.S. Cl.
CPC .......... *G06F 16/24539* (2019.01); *G06F 9/46* (2013.01); *G06F 16/2228* (2019.01); *G06F 16/24552* (2019.01); *H04L 67/12* (2013.01)

(58) Field of Classification Search
None
See application file for complete search history.

(56) References Cited

U.S. PATENT DOCUMENTS 9,838,470 B2   12/2017  Erlmann et al.
2002/0156863 A1*  10/2002  Peng ................... G06F 16/9574
                                                             709/217
(Continued)

FOREIGN PATENT DOCUMENTS

WO    WO2014015893 A1    1/2014

OTHER PUBLICATIONS

PIInterface: OSISoft, "PI Interface for OPC DA Version 2.5.0.x", Jan. 2014 Accessible from <http://cdn.osisoft.com/interfaces/3405/PI_OPCInt_2.5.0.9.pdf> (Year: 2014).*

(Continued)

*Primary Examiner* — Polina G Peach
*Assistant Examiner* — Anugeetha Kunjithapatham
(74) *Attorney, Agent, or Firm* — Muncy, Geissler, Olds & Lowe, P.C.

(57) ABSTRACT

An automation device for process automation, with a server containing one or more process automation variables, wherein the server is configured to receive read and/or write requests from a client in communication with the automation device for at least one variable. The automation device adapted to: specify the time period between two read requests for the same read request variable and/or between two write requests for the same write request variable; specify a sampling time for the read or write request variable as a function of the specified time period; and enable read access to the read request variable in the address space of the server at the respective sampling time, independently of future read requests and/or to prepare write access to the write request variable in the address space of the server at the respective sampling time, independent of the previous write request.

26 Claims, 3 Drawing Sheets

(51) Int. Cl.
  *G06F 16/22* (2019.01)
  *G06F 16/2455* (2019.01)
  *H04L 67/12* (2022.01)

(56) References Cited

U.S. PATENT DOCUMENTS

| | | | | |
|---|---|---|---|---|
| 2002/0194434 | A1* | 12/2002 | Kurasugi | G06F 16/9574 |
| | | | | 711/158 |
| 2004/0215746 | A1* | 10/2004 | McCanne | H04L 67/42 |
| | | | | 709/219 |
| 2014/0208390 | A1* | 7/2014 | Brown | G06F 21/335 |
| | | | | 726/4 |
| 2015/0156252 | A1* | 6/2015 | Volkmann | H04L 12/185 |
| | | | | 709/203 |
| 2015/0189003 | A1* | 7/2015 | Erlmann | H04L 67/42 |
| | | | | 709/203 |
| 2017/0161122 | A1* | 6/2017 | Deiretsbacher | G06F 9/54 |
| 2018/0088548 | A1* | 3/2018 | Sangi | G05B 13/021 |
| 2018/0247178 | A1* | 8/2018 | Ide | G06N 3/004 |
| 2019/0342396 | A1* | 11/2019 | Tanabe | H04L 12/40019 |

OTHER PUBLICATIONS

NPL_OPC-Security_Aug. 14, "OPC Unified Architecture Secure communication with IEC 62541 OPC UA", Aug. 9, 2014 (Year: 2014).*

Chen, "How OPC UA Servers Facilitate Efficient SCADA Device Data Management.", Moxa Incorporated, Dec. 23, 2014.

Cavalieri et al, "Performance Evaluation of OPC UA." University of Catalania, Italy.

* cited by examiner

AUTOMATION DEVICE AND METHOD FOR OPTIMIZED ACCESS TO A VARIABLE

This nonprovisional application claims priority under 35 U.S.C. § 119(a) to German Patent Application No. 10 2018 101 203.9, which was filed in Germany on Jan. 19, 2018, and which is herein incorporated by reference.

BACKGROUND OF THE INVENTION

Field of the Invention

The present invention relates to an automation device for process automation, wherein the automation device is set up to access at least one variable in a server, which is present on the automation device and runs there. The invention also relates to a method for optimized access to at least one variable in a server of an automation device.

Description of the Background Art

In process automation, the corresponding technical processes are controlled by means of sensors, actuators and controls. The data generated by the sensors are transmitted to the controller via a mostly proprietary communication system, evaluated, and then corresponding data is generated based on the evaluation, which is output to the actuators so as to be able to automatically control and regulate the process. The resulting process data is often displayed graphically in a control center in order to be able to ensure monitoring of the entire process, which is regulated and controlled by the automation, by trained personnel.

In order to achieve communication as standardized as possible between the machines and devices of the overall automation system involved in the automation, the OPC (open platform communications) protocol was developed, which in the latest generation is known as OPC UA (OPC unified architecture). With the aid of this protocol, it is possible, in particular, to store the process data obtained during an automation process in a structured manner and to make it available to other devices and components. Consequently, OPC UA is a communication protocol and information on the model for communication of various elements of an automation system and for data storage and the provision of corresponding automation-relevant data.

OPC UA is a classic client-server model in which the server provides the necessary communication structures as well as data and information on an automation device, wherein the communication in this case is usually initiated by a querying client. The OPC UA server usually contains a number of variables that are stored as an OPC UA node in an address space of the server. Such variables may include, for example, process variables or their values, and in particular have actual values or desired values. However, these can also be groups of process values and process variables that are grouped under the node.

To read out such a variable, the client sends a read request based on the OPC UA communication protocol to the server, which then retrieves the read request variable in the address space and reads out the values or process variables assigned to this variable from the address space. Subsequently, the OPC UA server generates a response message for the client, which contains the values that are read out when accessing the variable. If the variable is an external device connected to the automation device running on the OPC UA server, it is not uncommon for this device to be queried when looking up the variable in the address space, based on the OPC UA communication protocol, to get the desired values. The response message is only generated when the corresponding values of the variable are present and can be used in the response message.

The same applies to write accesses in which the client or the OPC UA client transmits a corresponding write request to the OPC UA server in accordance with the OPC UA communication protocol, wherein corresponding values for the write request variable are contained in the write request. The OPC UA server then retrieves the variable in the address space and would execute a corresponding write access to the variable, wherein this can lead to further transmission of the values to said devices, in particular with devices connected to the automation device of the OPC UA. Only after corresponding positive feedback of the successful write access to the OPC UA server has been transmitted will a corresponding confirmation message be sent to the OPC UA client for successful write access.

Due to the fact that the OPC UA follows a very strict client-server model, an OPC UA server is often also used on small, low-performance automation devices. Read or write requests to such an OPC UA server place a disproportionate burden on the limited resources of such automation devices since each read request and each write request of a variable is only reported to the client after the variable has been retrieved in the address space and the corresponding value has been specified. Furthermore, the response to the client remains unanswered until the whole process of retrieving the variable and the valuation has been completed. Depending on the complexity of the structure of the OPC UA server or a corresponding system-related utilization of the resources of the server machine, this can also result in significant latencies, which may prove negative in the further course of the automation process.

From WO 2014/015893 A1, which corresponds to U.S. Pat. No. 9,838,470, a method for optimizing repeated write access from a client to at least one variable in an OPC UA server is known, wherein the OPC UA server for this purpose has a corresponding call routine, which can be called by the querying client. When calling this call routine, an access time period of a querying variable for repeated write accesses is transmitted, wherein subsequently, each write access to a variable is first stored in a data structure, wherein at a later time, the variable value is then written to the address space by write access, in accordance with the transmitted access time period.

The disadvantage here is that this makes sense only with very strict cycle times and, at the latest with varying cycle times or alternating cycle times, such an approach encounters its limit. In addition, the client must know its own cycle time in advance, which is simply not possible especially in non-deterministic or quasi non-deterministic processes.

SUMMARY OF THE INVENTION

It is therefore an object of the present invention to provide an improved automation device and an improved method for accessing variables of a server, in particular an OPC UA server, with which the read and write accesses with regard to the resource utilization of the server system can be improved.

In an exemplary embodiment, an automation device for process automation is provided, wherein the automation device has a server. The server is installed on the automation device and is executed in the operating state of the automation device. In particular, the server can be an OPC UA server according to the OPC UA communication protocol.

The automation device has a plurality of interfaces for connecting the automation device with one or more data buses, so that the automation device can communicate with other components of the automation system. Such components may, in particular, be clients that wish to communicate with the server of the automation device. Such clients can in particular also be OPC UA clients. The server of the automation device is now set up such that it can receive read and/or write requests from a client connected to the automation device for at least one variable so as to allow a client access to such a variable in the server.

A read request in the sense of the present invention can mean a request that is transmitted in the form of a message from the client to the server of the automation device, wherein based on the read request, the server returns one or more values of the variable to the client in the form of a response message. In this case, a write request is understood to mean a message that is sent by the client to the server, wherein the message regarding the write request variable contains a value which is to be stored in the server with regard to the queried variable. Again, the client usually receives a corresponding confirmation of access (not mandatory).

A read request variable within the meaning of the present invention thus can mean a variable in the server which is to be accessed by the client with the aid of a read request. In the context of the present invention, a variable queried in writing is a variable in the server which is to be accessed by the client with the aid of a write request. An automation device in the sense of the present invention is understood in particular to mean a component of an automation system which has in particular a microcontroller or microprocessor computing unit and in particular also has a volatile and/or non-volatile memory in which data and information can be stored.

According to the invention, it is now provided that the automation device, in particular the server of the automation device, is set up to first specify the time period between two read requests for the same read request variable and/or the time period between two write requests for the same write request variable. This means that the time period between two requests for one and the same variable is specified by a timing process started in the automation device, which can be realized for example by a simple timer circuit.

According to the invention, it is further provided that a sampling time point is specified for the queried read or write variable as a function of the specified time period, wherein the sampling time characterizes that point in time at which the queried variable is to be either read or written in the address space, depending on the type of request. At the respective sampling time, which was specified based on the specified period of time, access to the variables is then performed by the automation device or the server in the address space of the server according to the invention, independent of a future read request or a previous write request.

As a result, according to the invention, the read and/or write request, which is sent from the client to the server is independent of the actual access to the read or write request variable by the server, thereby saving resources within the automation device and reducing latencies for corresponding requests from the client.

In this context, a sampling time in the sense of the present invention is understood to mean the point in time at which the server is actually reading or writing to the queried variable in the address space of the server. By means of a separate sampling time for the reception of requests from one or more clients, access to the variables in the address space is thus decoupled from the corresponding client query, without the need for special access time periods to be transmitted to the server as in WO 2014/015893. Rather, a self-learning, predictive system is created by the sampling time being specified as a function of the specified time period, which system autonomously learns the cycle times and specifies the corresponding sampling times independent of the request times.

The determination of the sampling time as a function of the specified time period between two requests is to be understood in the widest sense as meaning that the sampling time for the future is chosen such that it does not coincide with a point in time at which, according to the specified time period, a further client request would be expected. Rather, the sampling time is chosen such that it differs by a corresponding offset from a future request time derived from the specified time period.

It is certainly conceivable and also particularly advantageous if several sampling times are specified for a read request variable or a write request variable, for example, which all have an equidistant time period. It is also conceivable, however, that depending on the specified time period, different distances between individual sampling times for one and the same variable may exist.

In addition, it is particularly advantageous if separate sampling times are specified for each variable, so that in the case of a large number of variables, individual sampling times for each individual variable are also specified in each case.

In the case of a read request variable, it is advantageous if read access for the queried variable is carried out in the address space of the server at the respective sampling time and the variable value obtained by the read access for the queried variable of a data structure is stored. In the case of a future read request, which is later than the time of said sampling time, the variable value for the queried variable stored in the data structure is then taken from the data structure and sent to the client in response. In this case, therefore, in particular in the case of an OPC UA client server model, the variable is not correspondingly accessed in the address space of the server based on the read request, as would be usual, and then the result would be sent back to the client, but instead, according to the invention, a variable value previously specified at the sampling time is taken from a data structure of the server, which was previously specified at the sampling time, whereby the resources for the read request are significantly less loaded for the respective read request and moreover, the request is independent of the respective variable access.

In a write request variable, the variable value contained in the received write request for the queried variable is stored in a data structure, so that after storing the variable value regarding the queried variable, the write request confirmation can immediately be sent to the client. At the respective sampling time, write access for the queried variable is now enabled with the variable value stored in the data structure, so that the server of the automation device now obtains the variable value for the queried variable stored in the data structure at the sampling time and enables a corresponding write access to the variable in the address space. Again, write access of the server is independent of the client's write request and is also decoupled therefrom.

The automation device and in particular the server or the OPC UA server is set up in such a way that in the case of a read request for a read-request variable, the variable is included in a data structure if the variable is not yet present in the data structure. In this case, the data structure can be constructed sequentially, but also with branches, so that the queried variable is integrated into the data structure after a previously queried variable. For each variable stored in the data structure, separate sampling times may be provided. However, it is also conceivable that a common sampling time is provided for all variables at which individual variable accesses are processed one after the other. Incidentally, the same also applies to write requests with regard to a write request variable, which is likewise included in a data structure if it does not yet exist in such a data structure.

In this case, it is conceivable that in each case a separate data structure is built up for variables that are queried for reading and for writing, so that the individual sampling times for the read request variable and the write request variable can also be specified separately here. Again, as with the read request variables, it is conceivable that individual sampling times are specified for each individual variable queried in writing, or that there is a sampling time for all write request variables at which the corresponding write accesses are processed by the server.

In this case, it is particularly advantageous if the individual sampling times of the individual variables (for more than one variable) are set such that none of the sampling times lie within a request time predicted from the time periods. This means that the sampling time of a variable is specified such that it does not coincide with potential request times that are derived and possible from the specified periods of time of other variables. This ensures that any read or write request sent by a client has exclusive system resources that are not consumed by other CPU-intensive system processes, such as read or write access to variables in the address space.

The automation device and in particular the server is set up such that for the querying variable, a sampling time period is specified as a function of the specified time period, at the beginning or end of which the respective sampling time lies. By defining a sampling time period, quasi endless sampling times can be specified for the future, wherein the individual sampling times are defined by the characteristics of the sampling time period, namely by the period between the beginning and the end of the sampling time period. It is conceivable that a sampling time period is calculated separately for each variable, so that the same number of sampling time periods is provided for a large number of variables. However, it is also conceivable that only a single sampling time period is specified for all variables. It is also conceivable that a sampling time period is set, on the one hand, for the read request variables, and on the other hand, for the write request variables.

With regard to such a sampling time, it is conceivable that the automation device and in particular the server is set up in such a way that a sequence of successive time periods is specified for the same queried variable, a separate sampling time period being specified for each time period. This results in a sequence of consecutive sampling time periods, each of which may be different from each other, thereby defining different sampling time periods with different durations of time. As a result, it is possible for a request cycle of a client to be learned in a more finely graduated and accurate manner, in which, although repetitively, but nevertheless in succession, different time periods lie between individual requests. In this case, it is provided that a sequence including several sampling time periods starts anew at the end of the last sampling time period and the respective sampling time is then set to the beginning or the end of the first sampling time period.

As already mentioned, it is particularly advantageous to have such a sampling time within the specified time period or periods, so as to decouple access to the variable from the variable request.

Incidentally, the object is also achieved according to the invention with a method, wherein the method optimizes access to at least one variable in a server, in particular an OPC UA server, of an automation device. It may be advantageously provided that an automation device is provided, as described above. In accordance with the method, the automation device carries out the following steps: receiving at least two read or write requests sent by a querying client for the same read or write request variable, determining the time period between the two read or write requests for the same read or write request variable; specifying a sampling time for the read or write request variable as a function of the specified time period; and enabling read access to the read request variable in the address space of the server at the respective sampling time independent of future read requests or enabling write access to the write request variable in the address space of the server at the respective sampling time, independent of the previous write request.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
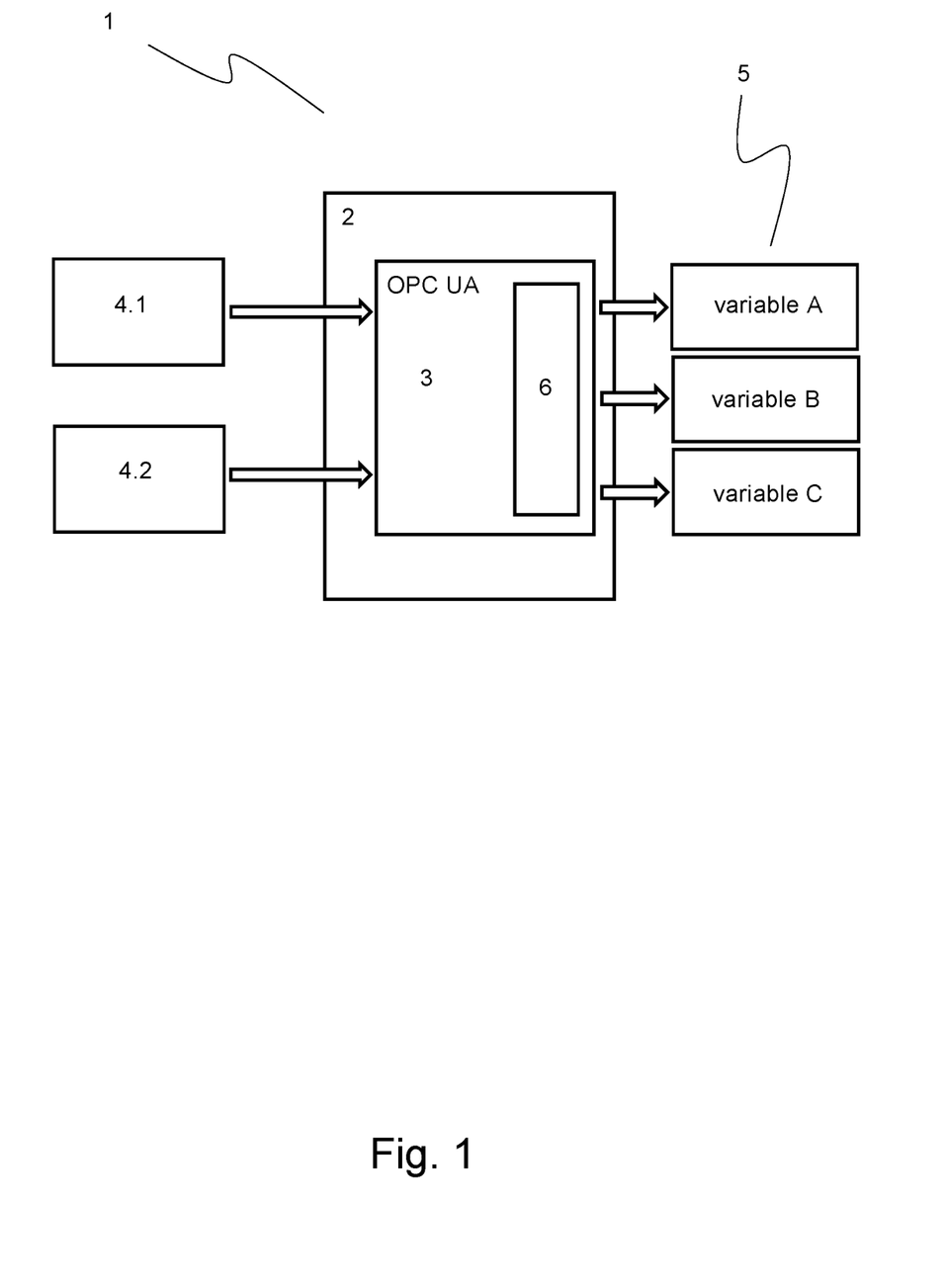
FIG. 1 is schematic representation of an automation system.

FIG. 1 schematically shows an automation system 1 which, in the exemplary embodiment of FIG. 1, has an automation device 2 according to the invention. In this case, the automation device 2 has an OPC UA server 3, which communicates with one or more clients 4 (via a suitable component of the automation device 2). The clients 4 are also OPC UA clients that can send corresponding requests to the OPC UA server 3 of the automation device 2 via a communication bus and can receive corresponding response messages from the server 3.

The OPC UA server 3 is further associated with three variables 5, which are referred to in the embodiment of FIG. 1 as variable A, variable B and variable C. These variables 5 represent nodes within the OPC UA server structure and can in particular be fieldbus devices, which may be sensors or actuators, for example.

According to the prior art, a client 4 would now send a request to the OPC UA server 3, whereupon the OPC UA server 3 of the automation device 2 retrieves the queried variable, for example the variable A, in the address space and specifies the queried value of the variable A of the respective fieldbus device. Subsequently, the query is answered by a response message to the client and thereby, the specified variable value of the variable A is communicated. The same is true for write requests.

According to the invention, a prediction module 6 is now provided which decouples the request from the clients to the OPC UA server 3 for the variable accesses of the variables 5. The prediction module 6 is designed such that it stores each query from a client 4 and specifies the time period between two queries. Based on the period of time thus specified, a sampling time is then specified for the queried variable, to which the prediction module 6 carries out the corresponding read or write access of the read or write request variable, independently of the request from the clients 4.

If, for example, the variable A is queried to read in a repeating, cyclical manner, the time period between two read requests from a client, for example the client 4.1, is specified and the sampling time, for example, is placed exactly in the middle of the time period. At the respective sampling time, the variable A is now read by the prediction module and stored in a data structure or a data memory. In the next read request from the client 4.1, the variable A is now not queried directly in the address space and directly accessible for reading, but instead, the variable value stored in the data structure or in the data memory for the prediction module 6, which was read out at the last sampling time, is sent to the querying client 4.1 as a response message.

The same applies to write accesses, in which the time period between two write requests is likewise specified and, based on this, a corresponding sampling time, for example in the form of a sampling time period, is specified. If the client 4.2 now sends a write request for the variable B, the OPC UA server 3 receives the corresponding message and forwards it to the prediction module 6. There, the write request variable B or its transmitted value is stored in a data structure or in a data memory of the prediction module 6 and then, a corresponding confirmation message is sent to the client 4.2. For the client 4.2, the write request is thereby completed. At the sampling time, the prediction module 6 will now access the variable B in writing, using the variable value last transmitted and stored in the data structure or in the data memory as the basis for the write access.

Figure 2:
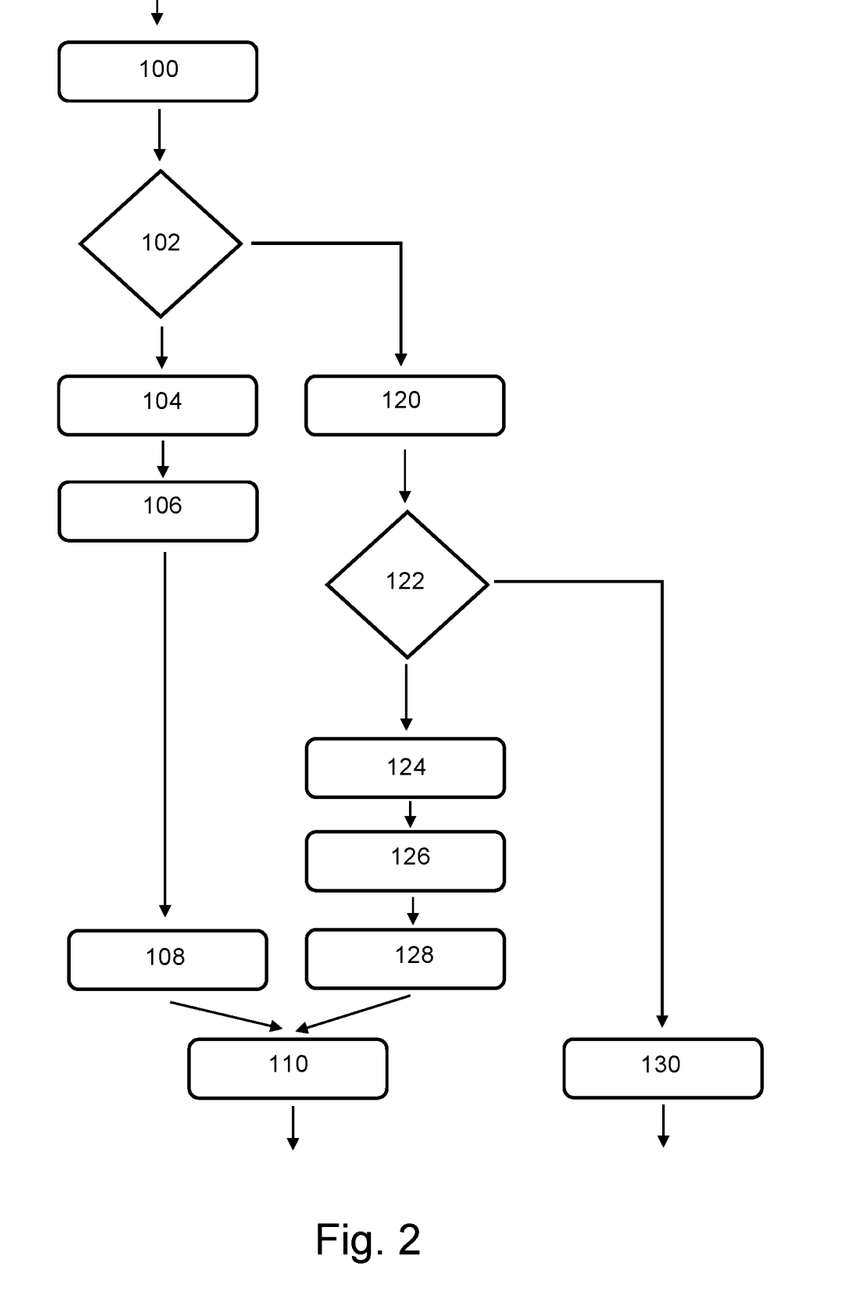
FIG. 2 is representation of a possible sequence of the method.

FIG. 2 shows, by way of example, the sequence for a query to a corresponding variable. For this purpose, the request for a variable is first transmitted in a first step 100 to the OPC UA server. Subsequently, it is checked in step 102 whether the queried variable is already present in the data structure or in the data memory of the prediction module. If this is the case, then the queried variable was more or less expected and was already part of a previous query, whereby already at the previous time, a corresponding timer was started. The period of time that has elapsed since the last request for this variable is now read out and specified in step 104, wherein after reading the elapsed time, the timer is set to 0 and restarted. In the next step 106, the sampling time can then be updated by, for example, adjusting the sampling time period or possibly generating a new sampling time period on the basis of a cyclical sequence of different requests. Finally, in the case of a read request variable, the variable value is taken from the data structure in step 108 or, in the case of a write requested variable, the transmitted value is written into the data structure. In step 110, a corresponding response message is then sent to the client.

However, if it was specified in step 102 that the queried variable is not yet present in the data structure or was not expected, then first, an attempt is made in step 120, which represents a second branch of this method, to resolve the queried variable in the address space. If the variable was then found in step 122, then the queried variable is added to the data structure in step 124, and then in step 126, the timing for determining the time period is started. Subsequently, in step 128, the variable in the address space is then accessed either read or write, as is known in the art. After accessing step 128, a response message 110 may then be sent to the client accordingly.

For completeness, it should be mentioned that an error message 130 is output if it was specified in step 122 that the queried variable does not exist in the address space.

Figure 3:
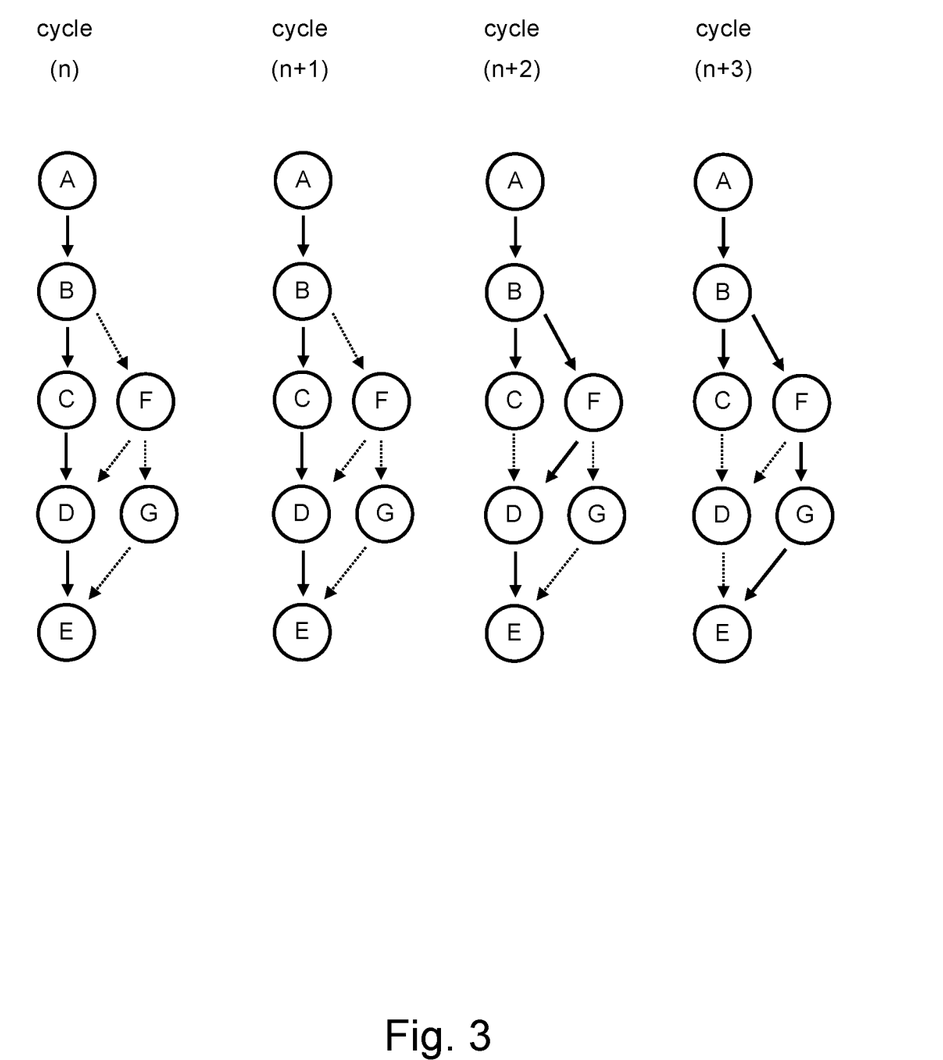
FIG. 3 is representation of a data structure across several request cycles.

FIG. 3 schematically shows a cyclically repeating query structure of several variables. For the sake of simplicity, a total of seven variables A-G are shown, which are present as nodes in the OPC UA server and can be accessed for reading and writing. Decisive here is that not every variable is queried with equidistant cycle times.

In the first cycle, the variables A, B, C, D and E are successively queried, wherein in the following cycle n+1, the variables A, B, C, D and E are also queried in this order.

For the further explanations, it is assumed that the time period between the beginning of a cycle n and a subsequent cycle n+1 is always t, so that the time period between the query of the variable A from the cycle n to the query of the variable A in the cycle n+1 is t. In the cycle n+2, there is now a deviation such that the variable F is queried instead of the variable C, resulting in a sequence of the query of the variables A, B, F, D and E. For the queried variable A, this still results in a sampling time period of t, which corresponds to the corresponding cycle time t. In cycle n+2, the variable F was queried for the first time. Finally, in cycle n+3 there is another deviation, such that after the query of the variable F, the variable G is queried, and then the variable E is queried, resulting in a query of variables A, B, F, G and E.

From cycle n+3, the previous accesses are repeated so that cycle n+4 corresponds to cycle N.

It can be seen that the variables A, B and E are queried in each cycle so that their time periods are always t, regardless of the cycle selected. Consequently, the time period of two queries of the same variable corresponds exactly to the cycle time t, regardless of the cycle in which the system is currently polling.

Therefore, for the variables A, B and E, a fixed sampling time period can be specified, which corresponds to the cycle time t and, if possible, lies between the respective accepted and expected request times.

The situation is different for the variables C, D, F and G. For example, the variable C is queried only in the cycle n and in the cycle n+1, but not in the cycle n+2 and n+3. It follows that for the variable C, across all four cycles, two different time periods between two consecutive requests can be assumed, which also results in two different sampling time periods. Thus, between the cycle n and the cycle n+1, the time period is exactly the cycle time t, while the time period until the next request in the cycle n then corresponds to the triple cycle time, therefore to $3t$. Based on the last query in the cycle n+1, there are two more cycles, namely n+2 and n+3, until the query starts again with cycle n. As a result, it will be necessary to await at least three cycle times until the variable C is queried again.

The same also applies to the variable F, which is queried as a substitute for the variable C and thus also has two sampling time periods, namely a sampling time period which corresponds to the cycle time t and a sampling time period which corresponds to the triple cycle time 3t.

This is a little different for the variable D. Only in the fourth cycle n+3 is the variable D not queried, so that a sequence of a total of three sampling time periods results in an alternating sequence. The first sampling time period of the variable D corresponds to the cycle time t and addresses the transition from the cycle n to the cycle n+1. This is followed by another sampling time period, which likewise corresponds to the cycle time t. In the fourth cycle, the variable is not queried, so that two cycle times 2t pass until the next query of the variable D, until the variable is queried again in the initial cycle n. The third sampling time period therefore corresponds to twice the cycle time 2t.

The last variable G, in turn, is queried in the four cycles, which repeat alternately, only in the last cycle n+3, so that their sampling time period corresponds to four times the cycle time 4t.

By constructing such a data structure, the behavior of the client requests can thus be learned and the corresponding access times or access periods can be predicted, which makes it possible to decouple the client requests from the variable accesses. This results in a lower load for the OPC UA server, which can now directly respond to the client's requests without the variables having to be retrieved first and the corresponding values returned. This has the advantage on the one hand that performance on the server is improved and the variables, which a client requests cyclically, are read at a defined sampling time.

In the case of read request variables, the value of a variable at a specific sampling time can already be queried internally in the server and already available at the time the client requests it. This sampling time can be synchronized across multiple devices if required. For synchronization, common methods can be used, such as those provided by synchronized fieldbuses. This allows clients to work with synchronized sampled values via an OPC UA connection.

If a client logs off from a server, the data structures are also deleted. When logging in again, the structures must be rebuilt. Also, the server can decide by itself to delete the data structure. This can be done, for example, if a client has not been active for a longer period of time and the resources are urgently needed. Even if it is detected that it is an A-cyclic access, the data structure can be deleted.

In a further variant, these data structures can also become persistent so as to ensure optimized accesses as quickly as possible in the event of a server restart. Also, for example, for analysis and optimization purposes, the constructed data structures can be read out.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. An automation device for process automation with an open platform communications unified architecture (OPC UA) server containing one or more variables of the process automation, wherein the OPC UA server for receiving read requests from a client in communication with the automation device is set up for read of at least one variable, the automation device being configured to:
   specify, at the OPC UA server of the automation device, a time period between two read requests for a same read request variable from the client, the OPC UA server determining the time period based on receipt times of the two read requests;
   enable read access to the read request variable in an address space of the OPC UA server at a sampling time corresponding to the address space, independent of future read requests of the client; and
   determine the sampling time as a function of a determined time span between two read requests,
   wherein the OPC UA server is set up:
      to enable read access for a queried variable in the address space of the OPC UA server at the respective sampling time,
      to store a variable value for the queried variable obtained by the read access in a data structure, and
      in a future read request, to send the variable value for the queried variable stored in the data structure to a querying client, the respective sampling time being assigned so as to not coincide with the future read request such that the client requests decouple from the read access for the queried variable.

2. An automation device for process automation with an open platform communications unified architecture (OPC UA) server containing one or more variables of the process automation, wherein the OPC UA server for receiving write requests from a client in communication with the automation device is set up for write of at least one variable, the automation device being configured to:
   specify, at the OPC UA server of the automation device, a time period between two write requests for a same write request variable from the client, the OPC UA server determining the time period based on receipt times of the two write requests;
   specify, by the OPC UA server of the automation device, a sampling time for an address space in the OPC UA server for the write request variable as a function of the specified time period;
   enable write access to the write request variable in an address space of the OPC UA server at the respective sampling time, independent of a previous write request of the client; and
   determine the sampling time as a function of a determined time span between two write requests,
   wherein the automation device is set up:
      to store a variable value obtained in a received write request for a queried variable in a data structure; and
      to enable write access for the queried variable with the write request variable deposited in a data structure at the respective sampling time such that the client requests are decoupled from the write access for the queried variable.

3. The automation device according to claim 1, wherein the automation device is set up to include said variable in a data structure, provided that the variable is not yet present in the data structure.

4. The automation device according to claim 1, wherein as a function of the specified time period, the automation device is arranged to set a sampling time period, the respective sampling time occurring at a beginning or end of the sampling time period.

5. The automation device according to claim 4, wherein the automation device is set up to specify a sequence of successive time periods if the queried variable is repeatedly queried, wherein a separate sampling time period is specified for each time period.

6. The automation device according to claim 1, wherein the respective sampling time is within the specified time period.

7. A method for optimized access to at least one variable in open platform communications unified architecture (OPC UA) server of an automation device, the method comprising:
receiving at least two read requests sent by a querying client for a same requested variable at the OPC UA server;
determining by the OPC UA server of the automation device a time period between the two read requests for the same read request variable based on receipt times of the at least two read or write requests;
determining by the OPC UA server a sampling time for the read request variable as a function of the time period;
enabling read access to the read request variable in an address space of the OPC UA server at the respective sampling time, independent of future read requests of the client; and
determining the sampling time as a function of a determined time span between two read requests,
wherein the sampling time is selected such that it deviates by an offset from a future read request, and
wherein a read request variable is a queried variable, the queried variable being the same read request variable:
at the respective sampling time, the read access for the queried variable is carried out in the address space of the OPC UA server;
a variable value for the queried variable obtained by the read access is stored in a data structure; and
in response to a future read request, the variable value for the queried variable stored in the data structure is sent to the querying client by the OPC UA server such that the client requests are decoupled from the read access for the queried variable.

8. A method for optimized access to at least one variable in an open platform communications unified architecture (OPC UA) server of an automation device, the method comprising:
receiving at least two write requests sent by a querying client for a same requested variable at the OPC UA server;
determining by the OPC UA server of the automation device a time period between the two write requests for the same write request variable based on receipt times of the at least two write requests;
determining by the OPC UA server a sampling time for the write request variable as a function of the time period;
enabling write access to the write request variable in the address space of the OPC UA server at the respective sampling time, independent of a previous write request of the client; and
determining the sampling time as a function of a determined time span between two write requests,
wherein the sampling time is selected such that it deviates by an offset from a future write request, and
wherein a write request variable is a queried variable, the queried variable being the same read request variable:
a variable value for the queried variable obtained from the client in a received write request is stored in a data structure, and
at the respective sampling time, the write access for the queried variable is carried out with the variable value for the queried variable stored in the data structure such that the client requests are decoupled from the write access for the queried variable.

9. The method according to claim 7, wherein, upon receipt of a future read request for a future read request variable, the future read request variable is included in a data structure if the future read request variable is not yet present in the data structure.

10. The method according to claim 7, wherein a sampling time period is specified as a function of the specified time period, the respective sampling time occurring at a beginning or end of the sampling time period.

11. The method according to claim 10, wherein for the same requested variable, a sequence of successive time periods is specified, wherein, for each successive time period, a separate sampling time period is specified.

12. The method according to claim 7, wherein the respective sampling time is specified within the specified time period.

13. The automation device according to claim 1, wherein one receipt time of the receipt times of the two read requests is a predicted receipt time, the predicted receipt time being predicted based on learning using past client requests, and
wherein the past client requests are stored in a query data structure.

14. The method according to claim 7, wherein one receipt time of the receipt times of the two read requests is a predicted receipt time, the predicted receipt time being predicted based on learning using past client requests, and
wherein the past client requests are stored in a query data structure.

15. The automation device according to claim 1, wherein the respective sampling time is stored with the same read request variable.

16. The method according to claim 7, wherein the respective sampling time is stored along with the same read request variable.

17. The method according to claim 7, wherein the automation device is set up to include said variable in a data structure, provided that the variable is not yet present in the data structure.

18. The automation device according to claim 1, wherein, upon receipt of a future read request for a future read request variable, the future read request variable is included in a data structure if the future read request variable is not yet present in the data structure.

19. The automation device according to claim 2, wherein the automation device is set up to include said variable in a data structure, provided that the variable is not yet present in the data structure.

20. The method according to claim 8, wherein the automation device is set up to include said variable in a data structure, provided that the variable is not yet present in the data structure.

21. The automation device according to claim 2, wherein, upon receipt of a future write request for a future write request variable, the future write request variable is included in a data structure if the future write request variable is not yet present in the data structure.

22. The method according to claim 8, wherein, upon receipt of a future write request for a future write request variable, the future write request variable is included in a data structure if the future write request variable is not yet present in the data structure.

23. The automation device according to claim 2, wherein one receipt time of the receipt times of the two write requests is a predicted receipt time, the predicted receipt time being predicted based on learning using past client requests, and wherein the past client requests are stored in a query data structure.

24. The method according to claim 8, wherein one receipt time of the receipt times of the two write requests is a predicted receipt time, the predicted receipt time being predicted based on learning using past client requests, and
wherein the past client requests are stored in a query data structure.

25. The automation device according to claim 2, wherein the respective sampling time is stored with the same write request variable.

26. The method according to claim 8, wherein the respective sampling time is stored along with the write request variable.

* * * * *